Nov. 11, 1952 — C. SHEER ET AL — 2,617,761

ARC PROCESS FOR THE SELECTIVE RECOVERY OF METALS

Filed Sept. 2, 1948 — 2 SHEETS—SHEET 2

Inventors
CHARLES SHEER
SAMUEL KORMAN
By Willis B. Rice
Attorney

Patented Nov. 11, 1952

2,617,761

UNITED STATES PATENT OFFICE 2,617,761

ARC PROCESS FOR THE SELECTIVE RECOVERY OF METALS

Charles Sheer, Washington Heights, and Samuel Korman, Brooklyn, N. Y.

Application September 2, 1948, Serial No. 47,425

5 Claims. (Cl. 204—164)

This invention relates to a process of selectively recovering valuable portions of an ore.

In our copending application, Serial No. 765,148, filed July 31, 1947, we disclosed a process in which the ore is reduced to an ionized vapor as the anode of a high intensity arc, and in the vapor form is reduced to chlorides by reaction with a halogen containing atmosphere. We have used chlorine as the halide because of its greater ease of handling, but advantages flow from the use of fluorine, and the technique of its use is well-known. We shall here refer to chlorine, but with the understanding that either chlorine or fluorine may be used.

It is an object of the present invention to accomplish the results of our parent application process with greater economy.

It is a further object to recover various valuable constituents in an ore separately or in a greatly enriched form from which separation can be easily effected.

It is an object of this process to recover such values from their ores and to do so with a sharp separation of the values recovered.

The process of the parent application in its preferred form comprises embodying the ore as a major constituent of the anode of an electric arc, with the current density at the anode face so chosen as to produce the high intensity arc effect where ionized vapor of the ore shoots out from the anode as an anode flame. The process is conducted in a halogen containing atmosphere in the presence of carbon to unite with the oxygen of the ore. This reaction may be given as follows when treating feldspar:

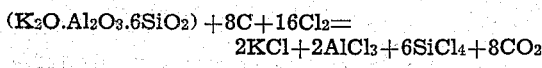

$$(K_2O.Al_2O_3.6SiO_2) + 8C + 16Cl_2 =$$
$$2KCl + 2AlCl_3 + 6SiCl_4 + 8CO_2$$

The effluent gases may contain a small percent of unreacted ore and surplus $Cl_2$.

The invention accordingly comprises a process composing the advantages and accomplishing results and involving the relationship of the steps one to another which will be exemplified in a process herein described and the scope of the application of the invention will be indicated in the claims.

For fuller understanding of the nature and objects of the invention, reference should be had to the following detailed description taken in connection with the accompanying drawings, in which.

Figure 1:
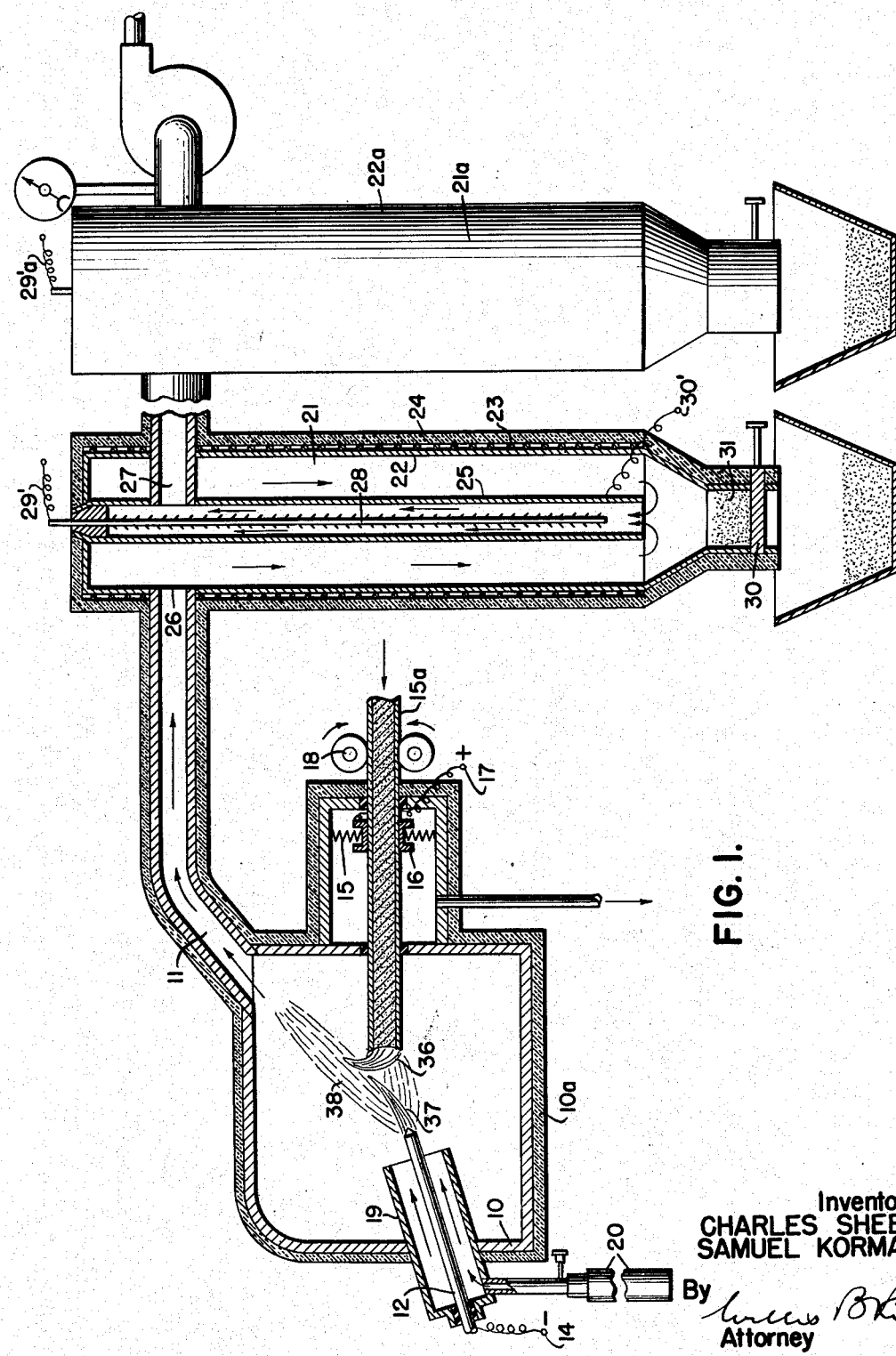
Fig. 1 is a front elevation of an apparatus which may be used in this invention.

Referring now to Fig. 1. The numeral 10 designates a chamber, insulated as shown at 10a, which is closed except for an outlet 11 through which the products of the reaction may be carried off and a chlorine inlet to be described.

Extending through the walls of the chamber are two electrodes 12 and 13, both of which make a tight fit through the walls to prevent the escape of chlorine, while permitting the feeding of the electrodes.

The phenomenon here involved is most easily understood as a direct current operation. On this account it is here disclosed as a D. C. arc. It will of course be understood, as it is well known that in an arc, when alternating current is employed, each current impulse throughout its own duration creates, in effect a direct current arc, the net effect of all being that each electrode in its turn serves as anode.

The high erosion arc here referred to and employed in this process is of the same general nature as the "high intensity" arc as the term is used in the literature following the nomenclature introduced by Basset and Sperry, who developed the new arc for use in search lights, and gave it its name because of the high intensity of illumination that results as soon as the transition point is passed. In the lighting industry, however, the erosion of electrodes was a dead loss and the intensity of light only, was desired. The erosion was, therefore, kept to the minimum. The high erosion arc of this process is an arc of similar character, but in which the light is a total loss, and the erosion is brought to the maximum.

The high erosion arc (including the high intensity arc) is an entirely different electrical phenomenon from the common arc. It comes into being as a sudden transition from the common arc, when current densities at the anode face are employed, which exceed a critical value. This change in kind of phenomenon is analogous to the change which occurs at much lower current densities, in the transition from a glow discharge to a common arc, which latter transition also occurs suddenly when the current density exceeds a critical point.

The location of the critical point in both cases depends upon a variety of factors, but in any given case the critical point is sharply shown and easily recognized by the marked changes in appearance and basic properties of the discharge. These changes all occur at the transition point and are the direct result of the difference of functioning of the two arcs.

The term high intensity, or high erosion are not too felicitous and must not cause confusion between this new type of arc and a common arc using a high current, since it is possible to operate a common arc with thousands of amperes, without getting the high erosion effect, and on the other hand, the high erosion effect may be obtained with currents as low as 10 amperes, with very small electrodes.

The markedly new characteristics which come into being with the high erosion arc when the current density exceeds the critical point, include the following:

In the normal arc, the crater of the anode, which is the hottest portion of the arc, reaches a temperature not greater than 3600 degrees C. This temperature is not sufficient to cause more than a negligible vaporization of the anode. The energy is dissipated predominantly in the form of radiation, and the erosion of the anode that occurs in air is almost wholly a slow oxidation of the solid incandescent carbon. In the new arc, the temperature jumps to between 7000 and 10,000 degrees C. At that temperature the entire electrode, including the carbon, is vaporized at great speed, resulting in a superheated region of extremely brilliant gases, immediately before the anode face which obscures the anode and in turn becomes an exceedingly brilliant source of light. It is the high light intensity of the vapors which first gave the new arc its name.

The result of this vaporization is also the emission from the anode of a high velocity jet of brilliantly luminous highly ionized vapor which shoots off out of the path of the current stream at a velocity of the order of one-sixth the velocity of sound. This brilliant jet may extend out as much as two feet from the electrode, although the electrode spacing may not be more than an inch.

Another of the characteristics which come into being at the critical point is a very sharp rise in the rate of erosion of the electrodes. With the common arc the energy is largely converted into radiant energy, and an increase in energy input within that range does not make a corresponding increase in the rate of erosion. As soon as the critical point of current density is reached, however, the very sharp bend occurs upward in the curve between power input and erosion rate, and the erosion becomes substantially proportional to the power input.

There also occurs with these phenomena a marked change in the volt-ampere curve of the discharge. In the normal arc range an increase in current is accompanied by a decrease in the arc voltage. Such an arc therefore requires a ballast for operation. This is spoken of as a negative resistance characteristic.

Within the scope of the high erosion arc, however, the arc acts like any normal resistance, requiring additional voltage to send more current. This is commonly referred to as a positive resistance characteristic. This sudden change from negative to positive resistance characteristic is therefore another feature by which the high erosion arc can be distinguished from the common arc.

The cathode electrode 12 is connected with the negative side 14 of a source of D. C. power. As the cathode is consumed very slowly, special means for feeding it are not illustrated.

The anode electrode 13, on the other hand, contains the ore to be reduced.

The cathode is here diagrammatically shown as slidingly supported in an insulator 16a and is energized through brackets 15 carrying carbon brushes 16 which are connected to the positive pole 17. Driven rollers 18 bearing upon the surface of the electrode 13 serve to feed it forward into the arc as fast as it is consumed. With an anode of 16 millimeters' diameter and a current in the neighbourhood of 1500 amperes, this rate will be in the neighbourhood of several feet per minute.

The composition of electrode 13 will depend upon the particular ore being reduced and on whether complete chlorination is performed. It is not critical. The carbon serves two purposes, first to reduce the resistance of the electrode and second to furnish enough carbon to combine all the oxygen liberated that is not otherwise disposed of. With feldspar, this composition will preferably be about 85% ore and 15% carbon. Since the function of the carbon in the anode is to render it conductive, if much less than 15% is used, the resistance of the anode will be unduly high. On the other hand, too much carbon merely wastes power, without corresponding benefit.

The resistance of the electrode 13 may be further reduced by surrounding it with a thin shell of carbon 13a, or if proper precautions be taken the electrode may be copper plated.

In any case, it is desirable to bring the brushes 16 as close to the arc itself as practical conditions permit in order to reduce the effective anode resistance.

If a cored carbon electrode be used as an anode, the core may be made to slide in the shell and may be fed into the arc at a much faster rate than the shell, since in this process the consumption of the core may be made to take place at a much higher rate than the carbon shell.

The cathode may be made of solid carbon, but there are advantages in using a neutral cored carbon which gives a stabilizing effect to the cathode flame, which is advantageous.

This process employs a high intensity arc, one characteristic of which is the long positive and negative flames that are thrown out from the electrodes. We have found it desirable to incline the electrodes out of alignment with each other, so that the jet effect is used to project the products toward the outlet 11. As shown, this angle is about 20°, but this angle may be increased to 150° or 160° if desired. Provision may be made to rotate the anode as it is fed.

In accordance with this invention, the foregoing process may be so employed in combination to separate the various components of the ore from each other as well as to reduce them, employing the principle of selective condensation of the effluent vapors.

The collection of the chlorides is diagrammatically disclosed in Fig. 1. As there shown, the discharge from the arc chamber is carried through an outlet duct 11 into a series of Cottrell precipitators 21, 21a in series, each comprising an outer shell 22–22a, which may have its temperature controlled by some form of heat control device, here shown as a heater 23 surrounding the shell. The precipitator 21 is shown in section. A layer of heat insulation 24 may be used to protect the Cottrell against being unduly affected by outside temperature.

Axially disposed within the shell 22 is a central cylinder 25 open at the bottom. The outer shell has an opening 26 communicating with the duct 11, and in turn the shell communicates with the cylinder through the open bottom of the latter. The inner cylinder discharges the condensed gases through an outlet 27.

Centrally disposed within the cylinder is a negative electrode 28 of the customary form, negatively charged at high tension at $30^1$ as is customary. Similarly, the cylinder is positively charged at 29¹. A discharge opening 31 at the bottom of the cylinder is closed by a valve 30 for removal of the condensate.

Two or more such Cottrells are arranged in series, and the temperature of each is regulated as will be disclosed.

With any substance which does not alter its composition within the temperature range involved, the relation between pressure and temperature at the dew point is commonly accepted as given by the formula $$\log p = \frac{A}{T} + B$$

where $p$ is in absolute pressure and $T$ absolute temperature and $A$ and $B$ are constants dependent on the gas and the standard of units employed.

Figure 3:
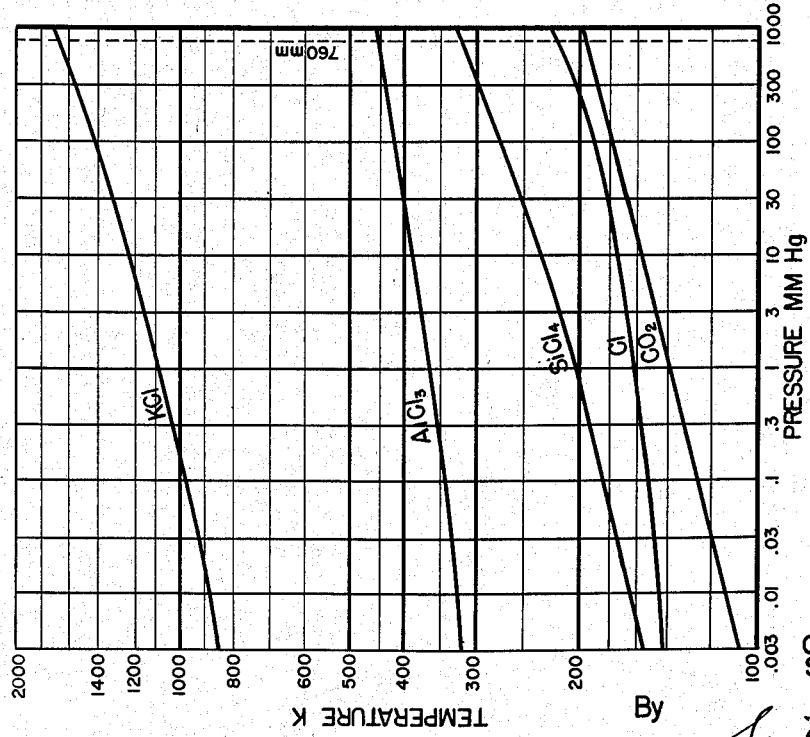
Fig. 3 is a diagram to show the relative dew points of the resultant vapors.

In Fig. 3 we show these curves plotted to logarithmic coordinates, the pressure being in mm. of mercury and the temperature in K. When so plotted, the curves will be seen to be almost, but not quite straight lines. As will be seen from the figure, the pressure range of the chart is from .003 mm. Hg to above atmospheric pressure. In most cases it will not be necessary to consider that portion below 1 mm. pressure.

The partial pressure of a gas at any given temperature is a measure of the quantity of that gas present in the mixture. This pressure theoretically never reaches zero, but we may for practical purposes consider the volume of gas remaining when its partial pressure has reached .1 mm. is negligible, and for most purposes we may consider it at 1 mm. In this specification we may call the least point we need consider the zero point.

As will be seen from Fig. 3, there is a definite temperature range in this dew point curve between this zero point, or point of practically complete condensation, and the dew point at atmospheric pressure, which for convenience we may call the condensation range.

As will be seen from Fig. 3, these four substances resulting from the full chlorinating reaction, namely, ore, KCl, AlCl₃, SiCl₄ and CO₂, have their condensation ranges separated. Thus, at a temperature of 500° K. all of the KCl will have condensed (and with it all of the carried over ore), but none of the AlCl₃. At 340° K. all of the AlCl₃ will be precipitated and none of the SiCl₄. At 190° K. all of the SiCl₄ and none of the CO₂.

Figure 2:
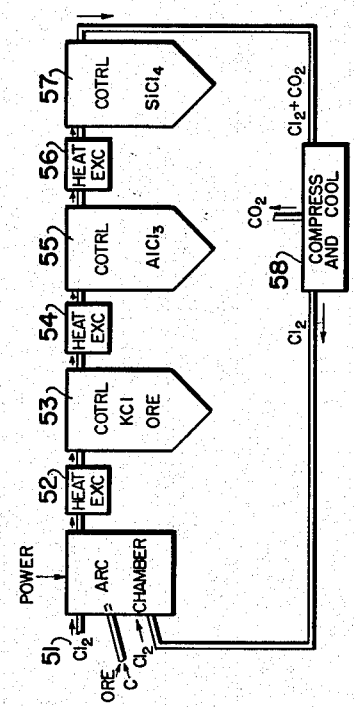
Fig. 2 is a schematic flow sheet of the operation of the process to produce complete chlorination.

Referring again to Fig. 2, the arc chamber 50 will be maintained at about 500° K. or higher. If carbon is used as the material of the arc chamber, it is desirable that the temperature walls shall not exceed 500° K. in the presence of CO₂. In this figure the reaction is fed with chlorine as gas, with carbon and ore in the anode and with power; part of the chlorine will come from recirculation. The effluent gases are carried through a heat interchanger 52 for purposes of temperature control to reduce the gases to 500° K., since the temperature of the effluent gases will be high as they leave the chamber. The temperature of the first Cottrell 53 will be maintained at this temperature of 500° K. All of the KCl and unreacted ore will thus be separated by this Cottrell.

The output of this first Cottrell 53 is passed through a second control heat interchanger 54 which reduces it to 340° K., which is maintained in Cottrell 55 while the aluminum chloride is separated. A third heat interchanger 56 and a third Cottrell 57 separate out the SiCl₄ at 200° K. The surplus chlorine passing through may be condensed by a pump 58 and returned to the process in chamber 50.

In accordance with this invention it has been discovered that if the atmosphere within the reaction chamber is deficient in chlorine a selective partial chlorination may be caused to take place. This can be accomplished by recycling SiCl₄ to the reaction chamber, in which case the reaction with feldspar takes the form (ignoring unreacted ore):

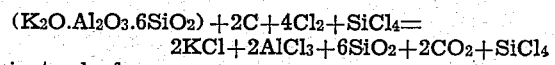

instead of

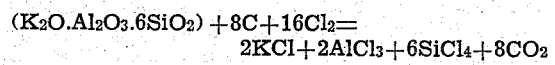

as previously given.

In these formulae we are treating the carbon as though it were all converted to CO₂, which is probable, but if it were partly or wholly in the form of CO, it would make little difference in the process.

The advantages of this embodiment lie in the fact that in the recovery about one half by weight of the effluent gases, which now include the Si as SiO₂, are removed in the first Cottrell by a very sharply defined precipitation, so that much smaller volumes of gas need to be handled in the metal removing Cottrells, and the partial vapor pressure of the metal chlorides is correspondingly higher. Moreover, in the first embodiment chlorine mixes with the SiCl₄, and the separation of SiCl₄ from chlorine is not wholly satisfactory, whereas when SiCl₄ is recycled all the chlorine gas is taken up and no chlorine appears in the resultant gas.

The economy of raw materials will be evident from the comparison of these formulae. As will be seen, the carbon consumption has been cut by 4 and the free chlorine consumption has been cut by 4, whereas all the SiCl₄ is recovered and reused. Moreover, the absence of free chlorine in the gases during separation makes it possible to use less refrigeration because of the greater ease of liquifying SiCl₄ than chlorine.

Figure 4:
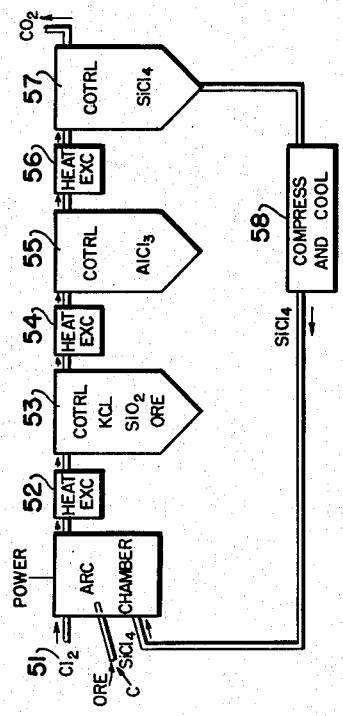
Fig. 4 is a schematic flow sheet of the operation of the process to give selective chlorination.

The schematic diagram of this embodiment is shown in Fig. 4. As will be seen, it differs from Fig. 2 only in that SiO₂ is precipitated with the KCl in the first Cottrell 52, and it is SiCl₄ which is recirculated from the last Cottrell instead of surplus chlorine. Moreover, since the gases passing from the last Cottrell do not contain chlorine, the CO₂ may be separated in this Cottrell and only the SiCl₄ compressed and cooled. The parts bear the same reference numerals as in Fig. 2.

In the arc chamber it is desirable to prevent any infiltration of outside air into the arc because of the detrimental effect of oxygen and moisture vapor, since even small traces of moisture are serious. At the same time, it is clearly important to prevent the escape into the outer atmosphere of any gases from within it, because of their poisonous character. For this reason we have found it most practical to operate the arc chamber at substantially atmospheric pressure.

In the first embodiment of the invention, therefore, the quantity of chlorine to be admitted to the arc chamber will be that quantity which is necessary to keep up the pressure within the chamber to the selected point in spite of the rapid withdrawal, and in our work this has involved the furnishing of more free chlorine than is required to combine with the ore. It is for this reason that the recirculation of chlorine is desirable and economically important. In the second embodiment of the invention, however, where the atmosphere is in part made up of the vapors of silicon tetrachloride, we may limit the quantity of free chlorine admitted to the arc substantially to that required to react with the metal values to be chlorinated, using the silicon tetrachloride in sufficient quantity to bring up the pressure to the desired value and to permit the carrying off of the reaction products with the desired rapidity.

It is probable that a reversing reaction takes place in the arc chamber, in that the silicon tetrachloride itself furnishes a portion of the chlorine required for the chlorination of the metals and is then reformed in the presence of the chlorine from the silica of the ore. In any event, so long as there is silica deposited from the reaction products there will be no free chloride. It will thus be clear the final over-all result is that three quarters of the oxygen of the ore is taken up in the silica, thus causing the saving in carbon, and the silicon of the ore being recovered as silica does not have to be chlorinated, thus resulting in a saving of three quarters of the carbon, with a saving of power in refrigeration.

This process is particularly useful in the recovery of metals from mixed ores, as for example, ores containing Be and Al, or Be and Mg, or mixtures of the alkaline earths. All of these ores yield mixtures of the chlorides and many of these have dew point curves which do not appreciably overlap. In such cases, the separation by condensation may generally be sharply made. Where two of them do condense together, the components of the resultant mixture will be of analogous composition and will be free from impurities and can be readily separated by standard methods.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

We claim:

1. The process of selectively recovering metals from their silicon containing ores which comprises forming an electrode of said ore with substantially 15% carbon, maintaining, with said electrode as anode, an arc at a current density on the anode face higher than that required to cause the appearance of a tail flame of anode vapor and to give to the arc a positive resistance characteristic, said arc being maintained in an atmosphere containing a halogen and a silicon halide, the halogen being supplied at a rate sufficient to halogenate the metal values to be reduced, and the silicon halide being present in sufficient quantity to prevent halogenation of the silicon, and then carrying off the resultant compounds and separating them.

2. The process of selectively recovering metals from their silicon containing ores which comprises forming an electrode of said ore with substantially 15% carbon, maintaining, with said electrode as anode, an arc at a current density on the anode face higher than that required to cause a tail flame of anode vapor and to give to the arc a positive resistance characteristic, said arc being maintained in an atmosphere of a mixture containing chlorine gas and silicon tetrachloride, the chlorine being supplied to the arc in quantity sufficient to chlorinate the metal values being reduced, and the silicon tetrachloride being present in sufficient quantity to prevent chlorination of the silicon, and then carrying off the resultant compounds and separating them.

3. The process of selectively recovering metals from their silicon containing ores which comprises forming an electrode of said ore with substantially 15% carbon, maintaining, with said electrode as anode, an arc at a current density on the anode face higher than that required to cause a tail flame of anode vapor and to give to the arc a positive resistance characteristic, said arc being maintained in a mixture containing chlorine gas and silicon tetrachloride, the chlorine being supplied to the arc in quantity sufficient to chlorinate the metal values being reduced, and the silicon tetrachloride being present in sufficient quantity to prevent chlorination of the silicon, and carrying off the resultant compounds and separating them in successive precipitators, in accordance with their dew point.

4. The process of selectively recovering metals from their silicon containing ores which comprises forming an electrode of said ore with substantially 15% carbon, maintaining, with said electrode as anode, an arc at a current density on the anode face higher than that required to cause the appearance of a tail flame of anode vapor and to give to the arc a positive resistance characteristic, said arc being maintained in an atmosphere containing chlorine and silicon tetrachloride, carrying off the resultant compounds and separating out from them the silica and silicon tetrachloride, and recirculating the silicon tetrachloride back into the arc chamber in sufficient quantity to prevent chlorination of the silicon in the ore.

5. The process of selectively recovering metals from their silicon containing ores which comprises forming an electrode of said ore with substantially 15% carbon, maintaining, with said electrode as anode, an arc at a current density on the anode face higher than that required to cause the appearance of a tail flame of anode vapor and to give to the arc a positive resistance characteristic, said arc being maintained in an atmosphere containing chlorine and silicon tetrachloride, replenishing said atmosphere with chlorine sufficient to chlorinate the metals to be chlorinated, and with silicon tetrachloride in sufficient quanity to prevent chlorination of the silicon, and separating the resultant compounds by fractional condensation.

CHARLES SHEER.
SAMUEL KORMAN.

REFERENCES CITED

The following references are of record in the file of this patent:

UNITED STATES PATENTS

| Number | Name | Date |
|---|---|---|
| 1,418,528 | Burgess | June 6, 1922 |
| 1,650,894 | Koehler | Nov. 29, 1927 |
| 1,752,936 | Austin et al. | Apr. 1, 1930 |
| 2,184,885 | Muskat et al. | Dec. 26, 1939 |
| 2,306,184 | Pechukas | Dec. 22, 1942 |